United States Patent Office 3,555,452
Patented Jan. 12, 1971

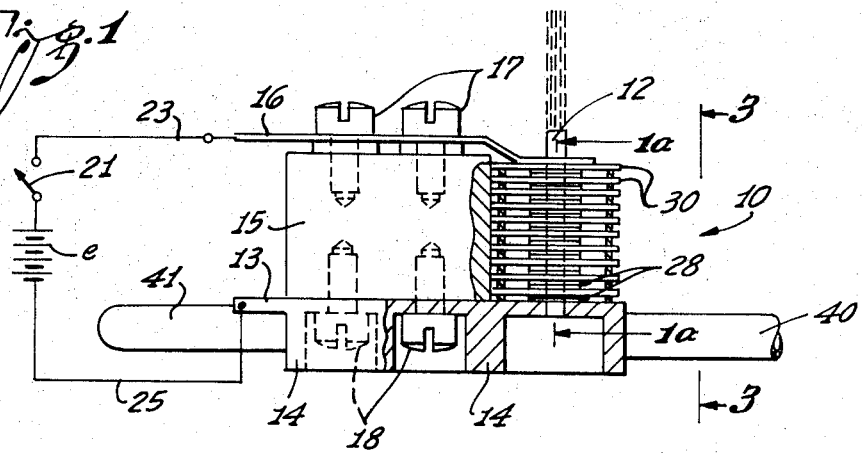
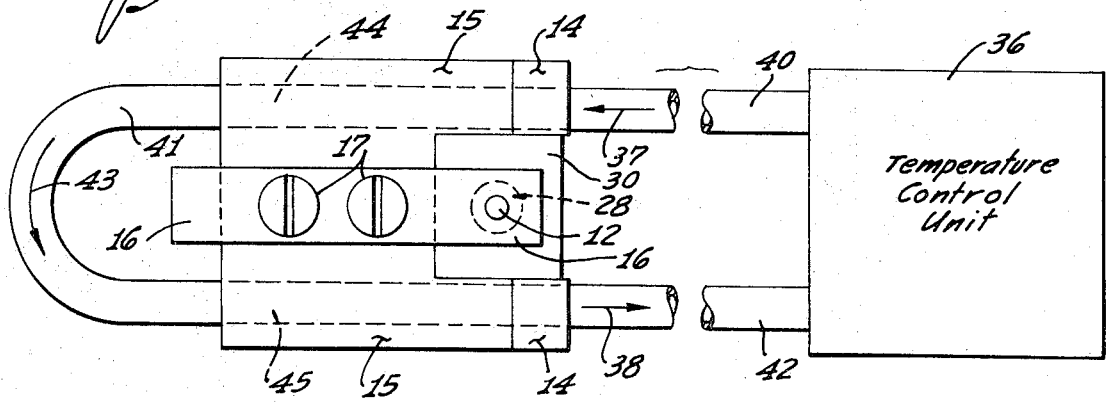
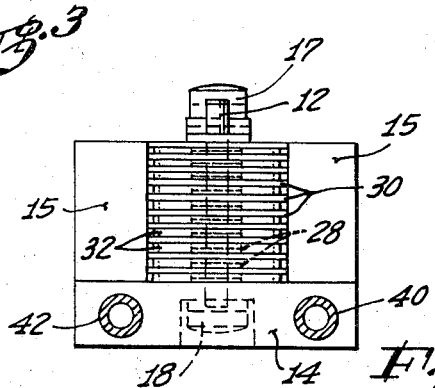
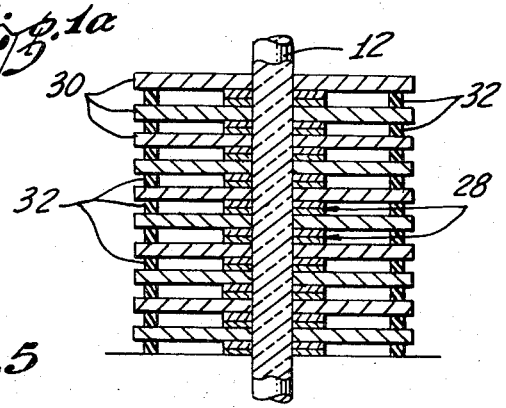
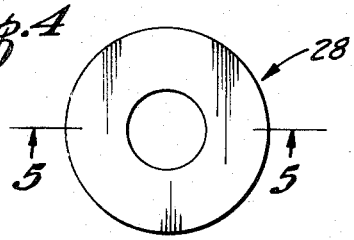
INVENTORS
JAMES W. NIELSEN
GERALD C. FLORIO
ATTORNEY

3,555,452
LASER APPARATUS
James W. Nielsen, Berkeley Heights, and Gerald C. Florio, Sr., Montclair, N.J., assignors to Litton Precision Products, Inc., San Carlos, Calif., a corporation of Delaware
Filed Oct. 2, 1967, Ser. No. 672,335
Int. Cl. H01s 3/00
U.S. Cl. 331—94.5                              7 Claims

ABSTRACT OF THE DISCLOSURE

A high efficiency, inexpensive, and mechanically simple laser device which operates at room temperature is presented. A plurality of annularly shaped luminescent diodes which radiate light energy at a frequency within the absorption band of a desired laser rod functions as an optical pump. Each of the annularly shaped diodes is stacked one on top of the other with each physically encircling the rod of laser material. Moreover, an annularly shaped cooling fin may be interposed between each diode in the stack to enhance the dissipation of heat. Each of the diodes is constructed of a mixture of gallium arsenide and gallium phosphide in relative mode proportions of 85% and 15% so that its radiation is readily absorbed by a neodymium yttrium aluminum garnet laser rod.

---

The present invention relates to the excitation of laser materials, and more particularly, to a mechanically simple and highly efficient arrangement for obtaining stimulated emission at room temperatures.

As is now well known in the art, the acronym "laser" stands for Light Amplification by Stimulated Emission of Radiation; and a laser device may operate either as an amplifier or a generator of coherent light. The active ions in laser material ordinarily occupy the lowest possible energy level available in the atomic structure. According to well known theory, such an ion exists in only one of a well-defined set of energy levels. To change the ion from one energy level to another requires a certain quantum of energy. As is known, light of specific frequencies, hence of specific energy quanta, is capable of supplying the required quantum of energy to the ion.

There is a close correspondence between a laser material's light absorption frequency and an ion's available energy levels within that material. Such light absorption frequency is proportional to the difference in energy between two of the available energy levels that an ion might occupy. Absorption of light energy by the laser material can, for a brief time interval, increase the proportion of ions occupying a high energy level within the particular material as compared with the ions in the lowest energy levels. When an ion of the laser material is illuminated with light of one of its critical frequencies, it absorbs a "quantum" of that light and jumps to a higher level. This process of raising ions to a higher energy level or "excited" quantum state, as it is sometimes called, by absorption of light energy is referred to as energy level inversion or population inversion, when the number of ions in the higher state exceeds those of a lower reference state.

From their excited quantum state, atoms of materials tend to return to normal or lower energy levels by spontaneously emitting energy. Through the phenomenon known as stimulated emission, however, ions can be made to give off energy before they emit energy spontaneously.

To accomplish this effect, light from a source of the proper frequency, commonly termed an optical pump, is directed upon a block of laser material. The laser block is fitted with two flat and parallel mirrors at least one of which is partially reflecting. The light energy is absorbed and causes a population inversion of ions. Some of the ions drop back to lower energy levels spontaneously emitting energy. As the light source causes an increasing spontaneous emission, the spontaneously emitted light energy is reflected back and forth in the laser material between the two mirrors. When a certain intensity of light radiation (called the threshold level) is built up between the mirrors simultaneously with the condition of population inversion in the laser material, stimulated emission occurs from those ions in their excited state. For a more complete description of this phenomenon reference is made to a publication by A. L. Schawlow and C. H. Townes which appeared in the Physical Review, vol. 29, page 1940 (1958) and to U.S. Pat. 2,929,922.

The importance of stimulated emission arises from the fact that the newly released energy is precisely in phase; that is, coherent with the energy that stimulated its release.

In the prior art, the laser pumping source usually has taken the form of a mercury or tungsten flash lamp which emits light energy across a broad band of frequencies. However, as is known, laser materials absorb light energy only within a small portion of the output band of frequencies of the flash lamp. Thus, much of the energy emitted by the flash lamp is not absorbed by the laser material, and, therefore, is not only wasted, but creates undesirable heating of the laser material. For this reason the conversion of pump power to laser radiation is presently very inefficient.

To alleviate this problem the prior art attempted to provide a coherent light source with a laser pumping source that radiates light energy only at a frequency within the absorption of the particular laser material. To accomplish this purpose one suggestion in the prior art was to use the light output emitted from gallium arsenide laser diodes. However, the number of solid state laser materials which may be pumped effectively using the coherent luminescent output of such laser diodes is severely limited. For example, in the prior art it has been demonstrated that gallium arsenide diodes may be used to stimulate photon emission from uranium doped calcium fluoride laser rods. However, in order to make such a combination operable, both the laser rod and the accompanying laser diodes had to be cooled to liquid helium temperatures. Thus, since the arrangement does not operate at room temperature, it is very impractical. Additionally, the absorption coefficient of the uranium ion in a calcium fluoride laser rod is extremely low in the frequency or radiation emitted by the gallium arsenide laser diode. For this reason, heretofore it has been found necessary to insert the calcium fluoride uranium rod into a mirrored cavity in order to obtain greater absorption of the laser diode radiation. In such construction the laser diodes are mounted along a slit in the side of the mirrored cavity.

Not only is it difficult to miniaturize the pumping source in such an arrangement, but also it is quite expensive to fabricate the pumping apparatus in this manner. Still further, laser diodes are considerably more costly than, for example, incoherent luminescent gallium arsenide diodes.

Therefore, it is an object of the invention to provide a laser which operates at room temperature;

It is a further object of the invention to provide a more efficient laser than was available heretofore;

It is a still further object of the invention to provide an inexpensive, miniaturized, and mechanically simple laser, and It is an additional object of the invention to provide a structure in a laser device which dissipates heat without cumbersome cooling equipment.

In accordance with one aspect of the present invention, the foregoing object is achieved by the use of a stacked plurality of annularly shaped luminescent diodes that radiate light energy at a frequency within the absorption band of a desired laser material. Each of these diodes physically encircles the laser material. Preferably, each annularly shaped diode is constructed such that its P-N junction extends to the inner peripheral surface of the annulus which is adjacent the laser material. In one illustrative embodiment of the invention for example, a plurality of annular diodes are stacked alternately with cooling fins, which separate the individual diodes on a laser rod so that each diode encircles the laser rod. The diodes are preferably electrically connected in series and excited by a source of direct current.

In accordance with another aspect of the invention, the diode is constructed of phosphide doped gallium arsenide so as to form a gallium phosphide, gallium arsenide composition in an approximate 15 mole percent-85 mole percent proportion.

These and other advantages and features which are believed to be characteristic of the invention, both as to its organization and method of operation, together with further objects and advantages thereof, will be better understood from the following description considered in connection with accompanying drawings in which one embodiment of the invention is illustrated by way of example. It is to be understood however that the drawings are for the purposes of illustration and description only, and are not intended as a definition of the limit of the invention.

In the drawings:

FIG. 1 schematically illustrates one embodiment of a miniaturized coherent light generator constructed in accordance with teachings of the present invention;

FIG. 1a is an enlarged, cross-sectional view of a plurality of anularly shaped diodes within the generator illustrated in FIG. 1 taken along the line 1a—1a of FIG. 1, the diodes being shown as they are positioned relative to a laser rod;

FIG. 2 is a top view of the embodiment of the present invention illustrated in FIG. 1, FIG. 2 further illustrating the connection of a temperature control unit to the coherent light generator;

FIG. 3 is an end view of the coherent light generator of the present invention illustrated in FIG. 1;

FIG. 4 is a top view of one annularly shaped diode, such as is employed in the apparatus of the present invention; and FIG. 5 is a cross-sectional view of the diode illustrated in FIG. 4 taken along the line 5—5.

With reference now to the drawings, wherein like or corresponding parts are similarly designated throughout the several views, FIG. 1 shows a schematic side view of a miniaturized coherent light generator 10 mechanized in accordance with the teachings of the present invention. The generator 10 is constructed to have a simplified structure employing an injection luminescent pumping principle for achieving an ideal energy transfer between a laser pumping source and a laser rod 12. The generator 10 includes a base element 14 to which an insulating block 15 is attached by a pair of nylon screws 18. The base element 14 also functions as a first conductive electrode, as will be described in greater detail hereinafter. For the present discussion, however, it should be noted that the base element 14 may be constructed of a material having a high thermal conductivity and a relatively low electrical resistance, such as copper. A second conductive electrode 16 is attached to the insulating block 15 by a pair of nylon screws 17. Within one end of the insulating block 15, and between the electrodes 14 and 16, is mounted the laser rod 12 having a plurality of annular shaped diodes 28 encircling it.

FIGS. 4 and 5 illustrate one type of annularly shaped diode that may be employed in the apparatus of the present invention. More particularly, the diode 28, illustrated in FIG. 4, may be fabricated, for example, from a wafer of gallium arsenide. By using conventional vacuum deposition techniques to diffuse tellurium into one side of the wafer, an N-type material layer 29 is formed; and by diffusing zinc into the other side of the wafer, a P-type material layer 27 is formed. The junction of the layers 27 and 29 creates a typical P-N junction 31 which, as shown in FIGS. 4 and 5, extends to an inner annular surface 33 of the diode 28.

When a DC voltage is applied across the P-N junction of a gallium arsenide diode, such as diode 28, the current flow above a given amount through the diode in the forward direction causes the diode to emit incoherent light energy from the P-N junction 31. In order to effect a maximum transfer of this light energy to the laser rod 12, as shown in FIG. 1a, the light emitting P-N junction 31 of each diode 28 is positioned contiguous with the cylindrical surface of the laser rod 12. This is accomplished by stacking the plurality of diodes 28 on the laser rod, the diodes 28 being separated by cooling fins 30 that are fabricated of a material having a high thermal conductivity and low electrical resistance, such as copper. The diode surfaces are metalized so that an ohmic contact is made between the cooling fins 30 and the adjacent diode surfaces, thereby connecting the diodes electrically in series.

In FIG. 1a it may be seen that a plurality of spacers 32 (that may be fabricated from an insulating material such as beryllium oxide) are positioned between the cooling fins 30 for preventing adjacent cooling fins from being deformed so as to touch one another, thereby short-circuiting the diode positioned therebetween.

Because of the efficient energy transfer between the diodes 28 and the laser rod 12, an arrangement which is equally effective for transferring light energy to the laser rod at room temperature, one is not limited in the selection of materials that may be used to form the laser rod. For example, a gallium arsenide diode of the construction previously described normally emits light energy at a frequency of about 9000 angstroms. Assuming that one wishes to fabricate the laser rod from a material such as neodymium doped yttrium aluminum garnet, which best absorbs light between 8050 and 8150 angstroms, one may "tailor" the frequency of emission of the diodes 28 by doping the diodes so that they pump the laser material at its most efficient energy band. For example, it has been found that by substituting in gallium arsenide fifteen atomic per cent of phosphorous for arsenic, a solid solution of gallium arsenide and gallium phosphide is formed which has a higher gap than pure gallium arsenide. Accordingly, higher energy photons are emitted from the diodes prepared in this manner. When biased in their forward direction the emitted radiation wavelength is changed from the 9000 angstroms observed for piece gallium arsenide to about 8050 angstroms.

The applicability of the neodymium yttrium aluminum garnet as a laser material is well described in the literature, for example, in the article by J. A. Koningstein and J. E. Geusic entitled, "Energy Levels and Crystal-Field Calculations of Neodymium in Yttrium Aluminum Garnet" which was published in The Physical Review, vol. 136, No. 3A, pages A711–A716, Nov. 2, 1964. Because of the flexibility of light output of the diodes 25, the laser rod 12 may also be fabricated of a number of other suitable materials which operate as lasers at room temperature. For example, rather than neodymium-yttrium aluminum garnet, the laser rod 12 could be fabricated using a holmium doped erbium oxide material or holmium and erbium doped yttrium aluminum garnet.

It should be noted that the diodes 28, when doped with phosphorous material as described hereinabove, pump the laser rod 12 near the infrared level within one of the laser rod's absorption bands. Thus, the only factor which limits the amount of energy being absorbed by the laser rod 12 is the absorption coefficient of the laser material of that particular frequency; that is, in the infrared absorption band. However, when emitting infrared light, the diodes 28 also emit a considerable amount of heat. To prevent this heat emission from degrading the output of the diodes 28, the electrode supports 14 may be fabricated from beryllium oxide, which has an extremely high thermal conductivity, and a temperature control unit 26 may be employed to pump a coolant (such as ice water or liquid nitrogen) through channels or bores in the generator 10 to keep the diodes at a constant temperature. The ideal constant temperature for the embodiment described herein is room temperature.

Referring now to FIG. 2, it may be seen that the base element 14 is fabricated to have a pair of channels or bores 44 and 45 passing therethrough. The bore 44 is connected to the bore 45 by a pipe 41 so as to form a circulating passage through the base element 14. A temperature control unit 36 is connected to the bores 44 and 45 by a pair of pipes 40 and 42, respectively for the purpose of pumping a coolant from the temperature control unit 36 (in the direction of an arrow 37) through the pipe 40, to the bore 44 and the pipe 41, through the bore 45 and back to the temperature control unit 36 (in the direction of an arrow 38) through the pipe 42. The circulation of a coolant in this manner through the thermally conductive element 14 helps maintain the diodes at a uniform temperature.

Thus, in operation, it is apparent that with the coherent light generator 10 of the present invention connected to a source of electric potential $e$, as shown in FIG. 1, a voltage can be applied across the serially connected annular diodes 28, thereby causing them to emit light from their P-N junctions 31. More particularly, as shown in FIG. 1, the positive terminal of the electric potential source $e$ is connected through a switch 21 and a wire 23 to the electrode 16, and the negative terminal of the potential source $e$ is connected to a terminal 13 connected to the base element and electrode 14 to permit the application of a DC voltage across the serially connected annular diodes 28 in the forward direction.

In order to produce an optimum average current level from diode to diode, the current is gradually increased while a measurement is made of the diodes output radiation. At a certain critical point, the heat losses start to reduce the output radiation from the diodes. At the optimum current level, however, a maximum amount of light radiation is transferred to the laser rod 12. Since each of the diodes has a DC current passing therethrough, they commence the emission of incoherent light of the selected frequency (for example, in the infrared band) from its respective P-N junction 31. This light is emitted directly into the laser rod 12 from all directions around the circumference of the rod 12. With such an arrangement, the optical or light pumping of the laser rod 12 is obviously of greater efficiency. Since an abundance of photons are emitted by the diodes 28 at a very efficient absorbing band (8050 angstroms, for example, in $Nd^{3+}$ doped YAG) of the laser material. Because so little radiation is lost in the form of heat in the laser material, the threshold for stimulated emission is reached at lower power inputs to the pump. That is to say, coherent output from the laser rod (10,600 angstroms in the case of $Nd^{3+}$ doped YAG) is observed sooner, and at a higher output level than observed with tungsten lamps provided cooling and diode construction permit efficient diode luminescence.

As is well known in the art, both ends of the laser rod 12 must be polished optically flat and parallel or be fitted with confocal mirrors. One end of the rod 12 is totally silvered, while the other end is partially silvered. The totally silvered end, of course, is totally reflective to photons being emitted by the ions of the laser rod 12, while the partially silvered end of the laser rod 12 reflects the photons only until such time as they have sufficient energy to begin the photon cascade, the time when the laser material begins to "lase."

It is to be understood that the above-described arrangements are illustrative of the application of the principles of the invention. Numerous other arrangements may be devised by those skilled in the art without departing from the spirit and scope of the invention. For example, the diodes 28 may be fabricated to be in a shape other than circular, as shown in the drawing, so long as the P-N junction of the diode is exposed in an aperture in the diode through which the laser rod 12 may pass. Additionally, other means of fabricating a mechanism for maintaining the diodes at room temperature may be proposed by those skilled in the art. As mentioned hereinabove, the selection of laser materials is not critical. Accordingly, it is to be expressly understood that the invention is limited only by the spirit and scope of the appended claims.

What is claimed is:

1. A generator of coherent light energy comprising: an elongated laser rod; optical pumping means surrounding said rod, said optical pumping means including a stacked plurality of annular shaped light emitting diodes, each of said diodes having an inner peripheral edge for emitting incoherent light of a predetermined frequency, which corresponds to the absorption frequency of said laser rod, from about said inner peripheral edge of each respective one of said diodes directly onto said laser rod; each of said diodes including a metalized conductive layer on both the top and bottom outer annular surfaces thereof to provide electrical contacts for connection in an electrical current path; said optical pumping means further comprising: at least a first plurality of annular shaped cooling fins of electrically conductive material of a larger outer diameter than said diodes; and wherein respective ones of said plurality of cooling fins are interposed in an abutting relationship between corresponding pairs of diodes for permitting heat conduction between said abutting diodes and respective fin and completing an electrical path between adjacent diodes.

2. The invention as defined in claim 1 further comprising: a base for supporting said optical pumping means and said cooling fins; said base including a first portion of electrical insulator material of high thermal conductivity abutting said plurality of cooling fins to permit the transfer of heat from said cooling fins to said base and a second portion of electrical conductive material coupled to said first portion and containing at least one groove in said second portion adapted to receive a cooling means; and cooling means coupled to said groove for circulating coolant thereby for transferring heat from said base to an external heat sink.

3. The invention as defined in claim 1 wherein each of said plurality of diodes comprising a composition of gallium arsenide and gallium phosphide.

4. The invention as defined in claim 3 wherein said gallium arsenide and gallium phosphide. of said composition.

5. The invention as defined in claim 2 further comprising: a source of direct electrical current; and means for applying said current across said stacked plurality of diodes in the forward direction for causing each of said diodes to emit incoherent light.

6. A generator of coherent light energy comprising: an elongated laser rod; optical pumping means located along the elongated side of said laser rod; said optical pumping means comprising at least one stacked plurality of light emitting diodes each of which surrounds said laser rod for emitting incoherent light of a predetermined frequency, which corresponds to the absorption frequency of said laser rod, directly onto said laser rod; each of said diodes in said stack including an electrically conductive layer on both the top and bottom surfaces thereof to provide electrical contacts for connection of each of said diode in an electrical current path; and said optical pumping means further comprising a plurality of electrically conductive cooling fins; respective ones of said plurality of cooling fins being interposed between corresponding pairs of adjacent diodes in an abutting relationship for permitting dissipation of heat and completion of an electrical path between adjacent diode.

7. The invention as defined in claim 1 wherein each of said diodes is of a positive polarity at its respective top surface and of a negative polarity at its respective bottom surface and all said diodes are oriented, geometrically, with their respective top surfacing the same direction, whereby said plurality of stacked diodes is placed electrically in series.

References Cited
UNITED STATES PATENTS

| | | | |
|---|---|---|---|
| 3,284,722 | 11/1966 | Gray | 331—94.5 |
| 3,427,563 | 2/1969 | Lasher | 331—94.5 |

RONALD L. WIBERT, Examiner

PAUL K. GOODWIN, Jr., Assistant Examiner

U.S. Cl. X.R.

332—7.51